(12) United States Patent
Alidedeoglu et al.

(10) Patent No.: US 8,901,243 B2
(45) Date of Patent: *Dec. 2, 2014

(54) BIODEGRADABLE ALIPHATIC-AROMATIC COPOLYESTERS, METHODS OF MANUFACTURE, AND ARTICLES THEREOF

(75) Inventors: Husnu Alp Alidedeoglu, Evansville, IN (US); Ganesh Kannan, Evansville, IN (US)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,865

(22) Filed: Mar. 30, 2012

(65) Prior Publication Data

US 2013/0261198 A1    Oct. 3, 2013

(51) Int. Cl.
    *C08G 63/60*    (2006.01)

(52) U.S. Cl.
    USPC ............................ 524/605; 525/444; 521/48.5

(58) Field of Classification Search
    None
    See application file for complete search history.

(56) References Cited

U.S. PATENT DOCUMENTS

| | | |
|---|---|---|
| 2,012,267 A | 8/1935 | Carothers |
| 3,634,089 A | 1/1972 | Hamb |
| 3,669,921 A | 6/1972 | Droke et al. |
| 3,833,685 A | 9/1974 | Wambach |
| 3,951,886 A | 4/1976 | Miyake et al. |
| 3,953,539 A | 4/1976 | Kawase et al. |
| 3,989,664 A | 11/1976 | Kawase et al. |
| 4,128,526 A | 12/1978 | Borman |
| 4,178,277 A | 12/1979 | Gebauer et al. |
| 4,328,059 A | 5/1982 | Horlbeck et al. |
| 4,401,804 A | 8/1983 | Wooten et al. |
| 4,452,933 A | 6/1984 | McCready |
| 4,482,700 A | 11/1984 | Kuhnrich et al. |
| 4,500,575 A | 2/1985 | Tiara et al. |
| 4,617,373 A | 10/1986 | Pruett et al. |
| 4,659,615 A | 4/1987 | Ishii et al. |
| 5,266,601 A | 11/1993 | Kyber et al. |
| 5,268,420 A | 12/1993 | Nishimura et al. |
| 5,271,985 A | 12/1993 | Tsunashima et al. |
| 5,378,796 A | 1/1995 | George et al. |
| 5,391,263 A | 2/1995 | Hepner et al. |
| 5,391,362 A | 2/1995 | Reinalda et al. |
| 5,413,681 A | 5/1995 | Tustin et al. |
| 5,446,079 A | 8/1995 | Buchanan et al. |
| 5,451,611 A | 9/1995 | Chilukuri et al. |
| 5,453,479 A | 9/1995 | Borman et al. |
| 5,498,749 A | 3/1996 | Heise et al. |
| 5,554,657 A | 9/1996 | Brownscombe et al. |
| 5,559,159 A | 9/1996 | Sublett et al. |
| 5,744,503 A | 4/1998 | Smith et al. |
| 5,817,721 A | 10/1998 | Warzelhan et al. |
| 5,844,023 A | 12/1998 | Tomka |
| 5,866,710 A | 2/1999 | Ridland et al. |
| 5,869,543 A | 2/1999 | Boos et al. |
| 6,020,393 A | 2/2000 | Khemani |
| 6,066,714 A | 5/2000 | Putzig et al. |
| 6,096,809 A | 8/2000 | Lorcks et al. |
| 6,120,895 A | 9/2000 | Kowitz et al. |
| 6,133,404 A | 10/2000 | Kang et al. |
| 6,166,170 A | 12/2000 | Putzig |
| 6,201,034 B1 | 3/2001 | Warzelhan et al. |
| 6,231,970 B1 | 5/2001 | Andersen et al. |
| 6,235,815 B1 | 5/2001 | Loercks et al. |
| 6,303,738 B1 | 10/2001 | Putzig et al. |
| 6,472,497 B2 | 10/2002 | Loercks et al. |
| 6,472,557 B1 | 10/2002 | Pell, Jr. et al. |
| 6,518,322 B1 | 2/2003 | West |
| 6,521,717 B1 | 2/2003 | Itoh |
| 6,573,340 B1 | 6/2003 | Khemani et al. |
| 6,582,818 B2 | 6/2003 | Haile et al. |
| 6,649,731 B2 | 11/2003 | Hori et al. |
| 6,660,211 B2 | 12/2003 | Topolkaraev et al. |
| 6,703,115 B2 | 3/2004 | Hale et al. |
| 6,706,843 B1 | 3/2004 | Ishihara et al. |
| 6,713,595 B2 | 3/2004 | Chung et al. |
| 6,803,389 B2 | 10/2004 | Kawamura et al. |
| 6,841,597 B2 | 1/2005 | Bastioli et al. |
| 6,998,462 B2 | 2/2006 | Duan et al. |
| 7,037,959 B1 | 5/2006 | Willett et al. |
| 7,129,301 B2 | 10/2006 | Wu et al. |
| 7,160,977 B2 | 1/2007 | Hale et al. |
| 7,176,251 B1 | 2/2007 | Bastioli et al. |
| 7,241,832 B2 | 7/2007 | Khemani et al. |
| 7,241,838 B2 | 7/2007 | Shelby et al. |

(Continued)

FOREIGN PATENT DOCUMENTS

| | | |
|---|---|---|
| DE | 19638488 A1 | 3/1998 |
| EP | 0103531 B1 | 3/1984 |

(Continued)

OTHER PUBLICATIONS

Bechthold et al., Chem. Eng. Technol. 2008, 31, No. 5, 647-654.*
U.S. Appl. No. 13/032,051, filed Feb. 22, 2011.
U.S. Appl. No. 13/183,786, filed Jul. 15, 2011.
U.S. Appl. No. 13/183,807, filed Jul. 15, 2011.
U.S. Appl. No. 13/183,821, filed Jul. 15, 2011.
U.S. Appl. No. 13/221,159, filed Aug. 30, 2011.
U.S. Appl. No. 13/397,189, filed Feb. 15, 2012.
U.S. Appl. No. 13/397,200, filed Feb. 15, 2012.
U.S. Appl. No. 13/397,210, filed Feb. 15, 2012.
U.S. Appl. No. 13/432,638, filed Mar. 29, 2012.
U.S. Appl. No. 13/433,390, filed Mar. 29, 2012.

(Continued)

*Primary Examiner* — Susannah Chung
*Assistant Examiner* — Robert T Butcher
(74) *Attorney, Agent, or Firm* — Cantor Colburn LLP; Diderico van Eyl

(57) ABSTRACT

Biodegradable compositions containing an aliphatic-aromatic copolyester derived from aromatic polyesters. Methods of making the compositions and articles made from the compositions.

27 Claims, 1 Drawing Sheet

(56) References Cited

U.S. PATENT DOCUMENTS

| | | | |
|---|---|---|---|
| 7,256,228 B2 | 8/2007 | Agarwal et al. | |
| 7,354,653 B2 | 4/2008 | Germroth et al. | |
| 7,368,503 B2 | 5/2008 | Hale | |
| 7,368,511 B2 | 5/2008 | Hale et al. | |
| 7,737,246 B2 | 6/2010 | Crawford | |
| 7,799,836 B2 | 9/2010 | Agarwal et al. | |
| 7,799,892 B2 | 9/2010 | Ravi et al. | |
| 7,910,645 B2 | 3/2011 | Ahmed et al. | |
| 8,038,658 B2 | 10/2011 | Kohama | |
| 8,088,834 B2 | 1/2012 | Agarwal et al. | |
| 2001/0014388 A1 | 8/2001 | Bastioli et al. | |
| 2002/0111409 A1 | 8/2002 | Talibuddin | |
| 2004/0092672 A1 | 5/2004 | Bastioli et al. | |
| 2004/0254330 A1* | 12/2004 | Duan et al. | 528/275 |
| 2005/0113534 A1* | 5/2005 | Agarwal et al. | 525/439 |
| 2005/0137304 A1 | 6/2005 | Strand et al. | |
| 2006/0004151 A1 | 1/2006 | Shaikh et al. | |
| 2006/0257676 A1 | 11/2006 | Itada et al. | |
| 2007/0010648 A1 | 1/2007 | Partridge et al. | |
| 2007/0066794 A1* | 3/2007 | Jernigan | 528/274 |
| 2007/0079945 A1 | 4/2007 | Noda et al. | |
| 2007/0082573 A1 | 4/2007 | Noda et al. | |
| 2007/0082981 A1 | 4/2007 | Noda et al. | |
| 2007/0093634 A1 | 4/2007 | Salsman et al. | |
| 2007/0208160 A1 | 9/2007 | Agarwal et al. | |
| 2007/0244242 A1 | 10/2007 | Agarwal et al. | |
| 2007/0264460 A1 | 11/2007 | Del Tredici | |
| 2007/0275242 A1 | 11/2007 | Gopal et al. | |
| 2007/0276069 A1 | 11/2007 | Agarwal et al. | |
| 2008/0039571 A1 | 2/2008 | Cohoon et al. | |
| 2008/0274320 A1 | 11/2008 | Yokoyama et al. | |
| 2008/0311385 A1 | 12/2008 | Miyazaki et al. | |
| 2009/0274885 A1 | 11/2009 | Egawa | |
| 2010/0041831 A1 | 2/2010 | Chung et al. | |
| 2010/0168317 A1 | 7/2010 | Cahoon-Brister | |
| 2010/0168336 A1 | 7/2010 | Cohoon-Brister | |
| 2010/0168371 A1 | 7/2010 | Berti et al. | |
| 2011/0071235 A1* | 3/2011 | Kannan et al. | 523/128 |
| 2011/0120346 A1* | 5/2011 | Reisacher et al. | 106/499 |
| 2011/0178265 A1 | 7/2011 | Tanaka et al. | |
| 2012/0232191 A1 | 9/2012 | Auggermann et al. | |
| 2013/0030116 A1 | 1/2013 | Okaniwa et al. | |

FOREIGN PATENT DOCUMENTS

| | | | |
|---|---|---|---|
| EP | 0272417 A2 | 6/1988 | |
| EP | 0573680 A1 | 12/1993 | |
| EP | 0634435 A1 | 1/1995 | |
| EP | 0736557 A1 | 10/1996 | |
| EP | 0575349 B2 | 8/2003 | |
| EP | 1344765 A1 | 9/2003 | |
| EP | 1426404 A1 | 6/2004 | |
| EP | 1437377 A1 | 7/2004 | |
| EP | 1473324 A1 | 11/2004 | |
| EP | 1627893 A1 | 2/2006 | |
| EP | 0950678 A1 | 12/2006 | |
| EP | 1862507 A1 | 12/2007 | |
| EP | 2003159 A1 | 12/2008 | |
| EP | 2042548 A1 | 4/2009 | |
| EP | 1947145 A2 | 12/2009 | |
| GB | 1507358 | 4/1978 | |
| GB | 2101617 A | 1/1983 | |
| WO | 0185824 A2 | 11/2001 | |
| WO | 2005017034 A1 | 2/2005 | |
| WO | 2007076384 A2 | 7/2007 | |
| WO | 2007089598 A1 | 8/2007 | |
| WO | 2007089600 A1 | 8/2007 | |
| WO | 2008042384 A1 | 4/2008 | |
| WO | 2008085396 A1 | 7/2008 | |
| WO | 2009127556 A1 | 10/2009 | |
| WO | WO 2010/034711 | * 4/2010 | |
| WO | 2010077809 A1 | 7/2010 | |
| WO | 2011054786 A1 | 5/2011 | |
| WO | 2013012706 A1 | 1/2013 | |
| WO | 2013012707 A1 | 1/2013 | |
| WO | 2013033285 A1 | 3/2013 | |

OTHER PUBLICATIONS

Chang et al.; "Copolyesters. VII. Thermal Transitions of Poly(butylene terephthalate-co-isophthalate-co-adipate)s"; vol. 51; Issue 6; Feb. 1994; pp. 999-1004.

English Abstract of EP0007445 A1; Date of Publication Feb. 6, 1980; 1 page.

English Abstract of EP0519367 A1; Date of Publication Dec. 23, 1992; 2 pages.

English Abstract of EP2258545 A1; Date of Publication Dec. 18, 2010; 2 pages.

English Abstract of JP2000109665 A; Date of Publication Apr. 18, 2000; 1 page.

English Abstract of JP2003220645 A; Date of Publication Aug. 5, 2003; 1 page.

English Abstract of JP2004050769 A; Date of Publication Feb. 19, 2004; 1 page.

English Abstract of JP2004098321 A; Date of Publication Apr. 2, 2004; 2 pages.

English Abstract of JP2004204038 A; Date of Publication; 1 page.

English Abstract of JP2005052479 A; Date of Publication Mar. 3, 2005; 2 pages.

English Abstract JP2005220278 A; Aug. 18, 2005; 1 page.

English Abstract JP2008045117 A; Date of Publication Feb. 28, 2008; 2 pages.

English Abstract of JP3776578 B2; Date of Publication May 17, 2006; 1 page.

English Abstract of JP60147430; Date of Publication Aug. 3, 1985; 1 page.

International Search Report for International Application No. PCT/JP2009/064418; International Date of Publication Nov. 10, 2009; Date of Mailing Nov. 17, 2009; 2 pages.

International Search Report for International Application No. PCT/US2012/026046; Date Mailed May 18, 2012; 5 pages.

Written Opinion of the International Search Report for International Application No. PCT/US2012/026046; Date of Mailing May 18, 2012; 8 pages.

International Search Report for International Application No. PCT/US2012/026048; Date Mailed May 18, 2012; 5 pages.

Written Opinion for International Application No. PCT/US2012/026048; Date Mailed May 18, 2012; 8 pages.

International Search Report for International Application PCT/US2012/026051; International Filing Date Feb. 22, 2012; Date of Mailing Aug. 3, 2012; 5 pages.

Written Opinion of the International Search Report for PCT/US2012/026051; International Filing Date Feb. 22, 2012; Date of Mailing Aug. 3, 2012; 9 pages.

Ukielski et al.; "Effect of Chemical Modification of Poly(butylene terephthalate) on elastic properties"; International Polymer Science and Technology, vol. 31, No. 3; Jan. 2004; 6 pages.

Witt et al.; "New Biodegradable Polyester-Copolymers from Commodity Chemicals with Favorable Use Properties"; Journal of Environmental Polymer Degradation; vol. 3; No. 4; no month, 1995; pp. 215-223.

U.S. Appl. No. 13/409,898, filed Mar. 1, 2012.

U.S. Appl. No. 13/409,983, filed Mar. 1, 2012.

Kleeberg et al.; "Biodegradation of Aliphatic-Aromatic copolyesters by Thermomonospora fusca and Other Thermophilic Compost Isolates"; Applied and Environmental Microbiology; vol. 64, No. 5; 1998, American Society for Microbiology; pp. 1731-1735.

International Search Report for International Application No. PCT/US2012/046625; International Filing Date Jul. 13, 2012; Date of Mailing Dec. 20, 2012; 4 pages.

Written Opinion of the International Search Report for International Application No. PCT/US2012/046625; International Filing Date Jul. 13, 2012; Date of Mailing Dec. 20, 2012; 6 pages.

International Search Report for International Application No. PCT/US2012/046627; International Filing Date Jul. 13, 2012; Date of Mailing Dec. 12, 2012.

(56) References Cited

OTHER PUBLICATIONS

Written Opinion of the International Search Report for International Application No. PCT/US2012/046627; International Filing Date Jul. 13, 2012; Date of Mailing Dec. 12, 2012.
International Search Report for International Application No. PCT/US2012/046629; International Filing Date Jul. 13, 2012; Date of Mailing Dec. 20, 2012; 4 pages.
Written Opinion of the International Search Report for International Application No. PCT/US2012/046629; International Filing Date Jul. 13, 2012; Date of Mailing Dec. 20, 2012; 6 pages.
International Search Report for International Patent Application No. PCT/US2012/052971; International Filing Date Aug. 30, 2012; Date of Mailing Dec. 10, 2012; 5 pages.
Written Opinion of the International Search Report for International Patent Application No. PCT/US2012/052971; International Filing Date Aug. 30, 2012; Date of Mailing Dec. 10, 2012; 7 pages.
DE 19638488 A1 English Abstract; Date of Publication Mar. 26, 1998 2 pages.
JP19840003496 English Abstract; Date of Publication Aug. 3, 1985; 2 pages.
Machine Translation of JP2004098321; Apr. 2004; 6 pages.
JP9087370A with English Abstract; Date of Publication Mar. 31, 1997; 6 pages.
International Search Report for International Patent Application No. PCT/US2012/068913; International Filing Date Dec. 11, 2012; Date of Mailing Mar. 25, 2013; 5 pages.
International Search Report of International Patent Application No. PCT/US2012/068907; International Date of Filing Dec. 11, 2012; Date of Mailing Mar. 25, 2013; 5 pages.
Written Opinion of the International Search Report for International Patent Application No. PCT/US2012/068907; International Date of Filing Dec. 11, 2012; Date of Mailing Mar. 25, 2013; 8 pages.
International Search Report of International Patent Application No. PCT/US2012/068909; International Filing Date Dec. 11, 2012; Date of Mailing Mar. 21, 2013; 5 pages.
Written Opinion of the International Search Report for International Patent Application No. PCT/US2012/068909; International Filing Date Dec. 11, 2012; Date of Mailing Mar. 21, 2013; 7 pages.
Written Opinion of the International Search Report for International Patent Application PCT/US2012/068913; International Date of Filing Dec. 11, 2012; Date of Mailing Mar. 25, 2013; 8 pages.
International Search Report for International Application No. PCT/US2012/071902; International Filing Date: Dec. 28, 2012; Date of Mailing Jun. 24, 2013; 5 pages.
Written Opinion of the International Search Report for International Application No. PCT/US2012/071904; International Filing Date Dec. 28, 2012; Date of Mailing Jun. 24, 2013; 7 pages.
International Search Report for International Application No. PCT/US2012/071904; International Filing Date Dec. 28, 2012; Date of Mailing Jun. 24, 2013; 5 pages.
Written opinion of the International Search Report for International Application No. PCT/US2012/071904; International Filing Date Dec. 28, 2012; Date of Mailing Jun. 24, 2013; 6 pages.
International Search Report for International Application No. PCT/US2012/071908; International Date of Filing Dec. 28, 2012; Date of Mailing May 7, 2013; 5 pages.
Written Opinion of the International Search Report for International Application No. PCT/US2012/071908; International Date of Filing Dec. 28, 2012; Date of Mailing May 7, 2013; 8 pages.
WO 2009127556 A1 English Abstract; Date of Publication Oct. 22, 2009; 2 pages.
WO 2011054786 A1 English Abstract; Date of Publication May 12, 2011; 1 page.
Scheirs et al.; "Modern Polyesters: Chemistry and Technology of Polyesters and Copolyesters"; 2003; pp. 293-321.

* cited by examiner

BIODEGRADABLE ALIPHATIC-AROMATIC COPOLYESTERS, METHODS OF MANUFACTURE, AND ARTICLES THEREOF

BACKGROUND

This invention relates to biodegradable aliphatic-aromatic copolyesters, combinations thereof with other polymers, and methods of manufacture of the copolyesters and compositions. These polymers and combinations thereof are useful as molded or extruded plastic objects, films, and fibers.

It is well known that billions of pounds of poly(ethylene terephthalate) (PET) are discarded into landfills annually all over the world. Some of the PET that is not reused is currently incinerated. The disposal of PET into landfills or its incineration is harmful to the environment. If PET (scrap) material could be converted into a useful aliphatic-aromatic copolyester, then there would exist a valuable environmentally progressive way to meet the unmet need to effectively use underutilized scrap PET in aliphatic-aromatic copolyester compositions.

For the foregoing reasons, there remains a long felt, unmet need to develop improved processes to effectively utilize polyester scrap.

There further remains a long felt, unmet need to need to develop new processes for making high molecular weight aliphatic-aromatic copolyesters, having good color and other thermal and mechanical properties.

Further for the foregoing reasons, there remains a long unfelt need to develop new articles from molding compositions that have useful performance properties, particularly where the articles utilize aliphatic-aromatic copolyesters derived from polyester scrap.

SUMMARY

The invention relates to a reacted product of:
(a) a dihydric alcohol group selected from an ethylene glycol group, 1,2-propylene glycol group, 1,3-propylene glycol group, 1,2-butanediol group, 2,3-butanediol group, 1,4-butanediol group, tetramethyl cyclobutanediol, isosorbide groups, 1,3-cyclohexanedimethanol groups, 1,4-cyclohexanedimethanol groups, hexylene glycol groups, bio-derived diol groups, and combinations thereof;
(b) an aromatic dicarboxylic acid group derived from a depolymerized aromatic polyester component selected from poly(ethylene terephthalate) homopolymers and copolymers, poly(butylene terephthalate) homopolymers and copolymers, poly(trimethylene terephthalate) homopolymers and copolymers, and combinations thereof,
(c) a titanium catalyst composition comprising titanium and optionally a color-reducing amount of a compound selected from phosphorus-containing compounds, nitrogen-containing compounds, boron-containing compounds, and combinations thereof;
(d) from 23 to less than 43 mole % of bio-based aliphatic dicarboxylic acid selected from bio-based adipic acid, bio-based succinic acid, and combinations thereof; and
(e) an aromatic polyester residue selected from an isophthalic acid group, antimony-containing compounds, germanium-containing compounds, cobalt-containing compounds, tin, tin-containing compounds, titanium, titanium-containing compounds, aluminum, aluminum salts, alkaline salts, alkaline earth metal salts, phosphorus-containing compounds, sulfur-containing compounds, naphthalene dicarboxylic acid groups, epoxies, and combinations thereof, wherein the aliphatic-aromatic copolyester has
a bio-based content from 17 to less than 41 weight %,
a Tm from 80 to 120° C., and
a modulus from 30 MPa to 116 MPa.

Another embodiment comprises a reacted product of:
(i) from more than 10 to 59.96 wt. %, based on the total weight of the composition, of the above-described aliphatic-aromatic copolyester;
(ii) from more than 40 to less than 89.96 wt. %, based on the total weight of the composition, of a polymer selected from aliphatic polyesters, aliphatic polycarbonates, starches, aromatic polyesters, cycloaliphatic polyesters, polyesteramides, aromatic polycarbonates, and combinations thereof;
(iii) from 0.01 to 5 wt. %, based on the total weight of the composition, of an additive selected from nucleating agents, antioxidants, UV stabilizers, plasticizers, epoxy compounds, melt strength additives, and combinations thereof;
(iv) from 0.01 to 45 wt. %, based on the total weight of the composition, of an additive selected from alcohols, acetates, alcohol-acetate copolymers, and combinations thereof; and
(v) from 0.01 to 2 wt. %, based on the weight of the composition, of an additive selected from crosslinkers, anti-aging agents, retrogradation agents, anti-blocking agents, water, odor-controlling agents, and combinations thereof.

In another embodiment, a process for preparing the above-described copolyester comprises:
(a) depolymerizing the aromatic polyester component, by reacting
(i) the aromatic polyester component with
(ii) a diol component selected from ethylene glycol, 1,2-propylene glycol, 1,3-propylene glycol, 1,2-butanediol, 2,3-butanediol, 1,4-butanediol, tetramethyl cyclobutanediol, isosorbide, 1,3-cyclohexanedimethanol isomers, 1,4-cyclohexanedimethanol isomers, hexylene glycol, bio-derived diols, and combinations thereof, in the presence of
(iii) a bio-based aliphatic dicarboxylic acid selected from bio-based adipic acid, bio-based succinic acid, and combinations thereof,
in a reactor, at a pressure that is at least atmospheric pressure, at a temperature from 160° C. to 250° C., under an inert atmosphere and with agitation, under conditions sufficient to depolymerize the aromatic polyester component into a molten mixture; and
(b) increasing the temperature of the molten mixture under subatmospheric conditions and agitation to a temperature from 240° C. to 270° C., thereby forming the copolyester of Claim 1;
wherein the process is carried out in the presence of the titanium catalyst composition optionally comprising titanium and a color-reducing amount of a compound selected from phosphorus-containing compounds, nitrogen-containing compounds, boron-containing compounds, and combinations thereof.

In another embodiment, an aliphatic-aromatic copolyester, comprising a reacted product of:
(a) a dihydric alcohol group selected from an ethylene glycol group, 1,2-propylene glycol group, 1,3-propylene glycol group, 1,4-butanediol group, and combinations thereof;

(b) a terephthalic acid group derived from a depolymerized aromatic polyester component selected from poly(ethylene terephthalate) homopolymers and copolymers, poly(butylene terephthalate) homopolymers and copolymers, poly(trimethylene terephthalate) homopolymers and copolymers, and combinations thereof;

(c) a titanium catalyst composition comprising titanium and optionally a color-reducing amount of a compound selected from phosphorus-containing compounds, nitrogen-containing compounds, boron-containing compounds, and combinations thereof;

(d) from 23 to less than 43 mole % of a bio-based aliphatic dicarboxylic acid selected from bio-based adipic acid, bio-based succinic acid, and combinations thereof; and (e) an aromatic polyester residue selected from an isophthalic acid group, antimony-containing compounds, germanium-containing compounds, cobalt-containing compounds, tin, tin-containing compounds, titanium, titanium-containing compounds, aluminum, aluminum salts, alkaline salts, alkaline earth metal salts, phosphorus-containing compounds, sulfur-containing compounds, naphthalene dicarboxylic acid groups, epoxies, and combinations thereof, wherein the aliphatic-aromatic copolyester has a bio-based content from 17 to less than 41 weight %, a number average molecular weight of at least 20,000 Daltons, a polydispersity index from 2 to less than 6;

a Tg that is at least −32 to 0° C., a Tm from 80 to 120° C., and a modulus at 25° C. from 30 MPa to 116 MPa.

The invention also relates to articles made from the compositions described above, e.g., films or sheets.

Figure 1:
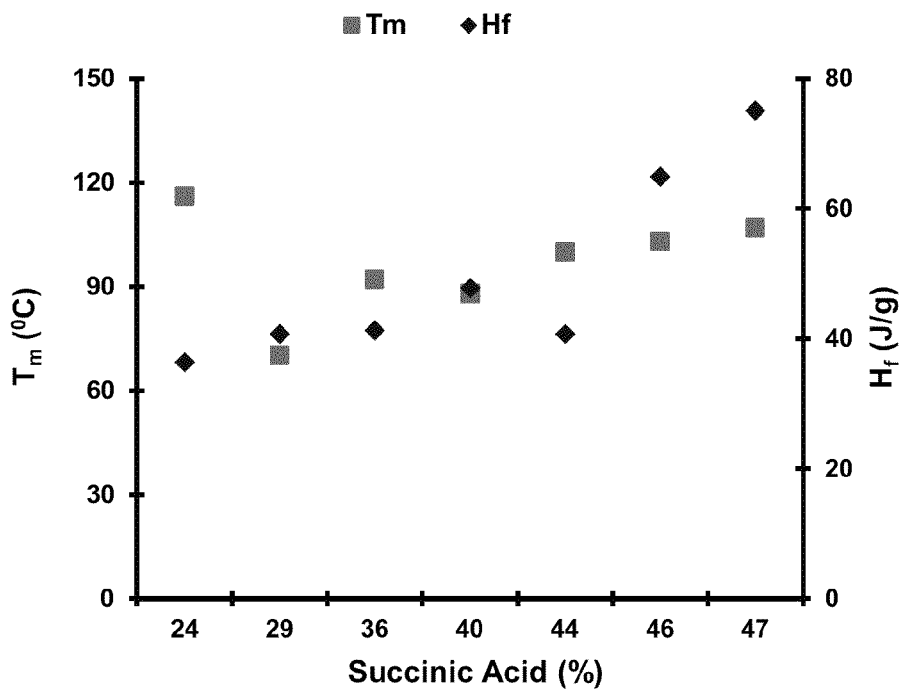
FIG. 1 is a graph showing the effect of mole percent of succinic acid in the backbone of poly(butylene terephthalate-co-succinate) derived from PET on $T_m$ and $H_f$

These and other features, aspects, and advantages of the present invention will become better understood with reference to the following description and appended claims.

DETAILED DESCRIPTION

This invention is based on the discovery that it is possible make a biodegradable composition in situ from used (recycle) polyesters, where the composition is suitable for film packaging applications. Advantageously, the utilization of used polyesters allows a polyester that would otherwise be discarded as waste to be used productively and the biodegradable composition can also be made with renewable materials such as bio-based adipic acid, bio-based succinic acid, and combinations thereof. By using a specific combination of stabilizers, we have also discovered that we can also make a composition with a copolyester having a white color, which is extremely useful for film packaging applications.

Our biodegradable composition includes various versions. In one version, our composition includes a combination of an aliphatic-aromatic copolyester, a second polymer, and an additive. Our composition can also include the combination of the aliphatic-aromatic copolyester.

The term "white," as used in this application, means that the material being described as white exhibits an L* value that is at least 75, or at least 80, or at least 85 with a corresponding set of "a" and "b" values that are substantially close to 0, (less than 5 units on the CIE color scale), where the "a" represents red and green hues and "b" represents blue and yellow hues of the white material on the CIE LAB color scale. The L* value can range from 75, or 80, or 85 to 100. The "L*, a, b" method for describing colors is well known and developed by the CIE (Commission Internationale de l'Eclairage). The CIE provides recommendations for colorimetry by specifying the illuminants, the observer and the methodology used to derive values for describing color 3 coordinates are utilized to locate a color in a color space which is represented by L*, a* and b*. When a color is expressed in CIELAB, L* defines lightness, if a value is closer to 0 it means total absorption or how dark a color is. If the L* value is closer to 100 it means total reflection or how light a color is. a* denotes how green or red a color is, whereas b* represents how blue or yellow a color is.

The term "recycle" as used herein refers to any component that has been manufactured and either used or intended for scrap. Thus, a recycle polyester can be polyester that has been used, for example in drinking bottles, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived poly(ethylene terephthalate) is derived from reactants that are themselves derived from petroleum.

The singular forms "a," "an," and "the" include plural referents unless the context clearly dictates otherwise. Further unless defined otherwise, technical, and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

Other than in operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All ASTM tests and data are from the 2003 edition of the Annual Book of ASTM Standards unless otherwise indicated.

The compositions include a biodegradable aliphatic-aromatic copolyester that is the reacted product of a dihydroxy compound and an aliphatic dicarboxylic acid with an aromatic polyester, in particular a recycle poly(ethylene terephthalate). Accordingly, the copolyester contains (a) dihydric alcohol group; (b) an aromatic dicarboxylic acid derived from a depolymerized aromatic polyester component selected from poly(ethylene terephthalate)s, poly(butylene terephthalate)s, poly(trimethylene terephthalate)s, and combinations thereof, (c) a titanium catalyst composition comprising titanium and optionally a color-reducing amount of a compound selected from phosphorus-containing compounds, nitrogen-containing compounds, boron-containing compounds, and combinations thereof, (d) a bio-based aliphatic dicarboxylic acid group bio-based adipic acid, bio-based succinic acid, and combinations thereof, and (e) an aromatic polyester residue selected from an isophthalic acid group, antimony-containing compounds, germanium-containing compounds, cobalt-containing compounds, tin, tin-containing compounds, titanium, titanium-containing compounds, aluminum, aluminum salts, alkaline salts, alkaline earth metal salts, phosphorus-containing compounds, sulfur-containing compounds, naphthalene dicarboxylic acid groups, epoxies, and combinations thereof.

Processes for preparing copolyesters by depolymerizing aromatic polyesters in the presence of polyols are known in the art. For example, U.S. Pat. No. 5,451,611 describes a process for converting waste polyethylene terephthalate to either poly(ethylene-co-butylene terephthalate) or polybutylene terephthalate by reaction with BDO. A principal objective of U.S. Pat. No. 5,451,611 was to provide a process for converting PET waste directly to another high value polymer without breaking down the PET to its constituent monomers or oligomers. The patent discloses numerous examples in which a variety of polymers have a combination of diols incorporated at various ratios of amounts. Example 11 of U.S. Pat. No. 5,451,611 patent shows a PBT polymer being formed with a complete replacement of EG by BDO. U.S. Pat. No. 5,266,601 and U.S. Pat. Application No. 20090275698 (A1) describe a process for making PBT from PET by reacting PET with BDO.

Catalysts effective to depolymerize the poly(ethylene terephthalate) component and form the oligomers are known, and include, for example, tin compounds, titanium compounds, and combinations thereof as well as many other metal catalysts and combinations of metal catalysts that have been disclosed in the literature. Specific examples of catalysts for polymerization and/or transesterification include antimony compounds, titanium isopropoxide, manganese diacetate, antimony oxide, dibutyl tin diacetate, zinc chloride, or combinations thereof. The amount of catalyst to obtain an acceptable depolymerization/oligomerization rate at the desired temperatures will vary, and can be determined by experimentation. For example, the catalyst amount can be 1 to 1000, 1 to 5000 ppm, or more, based on the weight of the poly(ethylene terephthalate) component. In an embodiment, the catalyst is a tetraisopropyl titanate, available from DuPont under the tradename TYZOR.

Conditions effective to depolymerize the poly(ethylene terephthalate) component and form the oligomers can vary depending on the particular poly(ethylene terephthalate) component, its purity, type of catalyst, amount of reactants, and like considerations, and can be determined by experimentation. For example, the depolymerization can be conducted at a temperature from 150 to 300° C. under atmospheric or reduced pressure and inert atmosphere.

The quencher can be a phosphorus-containing compound, a nitrogen-containing compound, a boron-containing compound, or a combination thereof.

Phosphorus-containing compounds include phosphoric acid, poly(phosphoric acid), phosphorous acid, monobutyl phosphate, dibutyl phosphate, monoalkyl phosphates, dialkyl phosphates, and combinations thereof.

Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

Generally, the quencher is selected from phosphoric acid, phosphorous acid, boric acid, and combinations thereof.

The dihydric alcohol group is the residue of a dihydric alcohol that is incorporated into the copolyester, and can be derived from any dihydric alcohol that reacts with the aliphatic dicarboxylic acid and the aromatic polyester to form the first dihydric alcohol group in the copolyester. Examples of suitable dihydric alcohols can include ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), bio-derived diols, hexylene glycols, and a combination thereof. Any of the foregoing dihydric alcohols can be derived from a biological source. In an embodiment all or a portion of the dihydric alcohols are derived from a biological source. "Bio-derived diols" as used herein refers to alcohols other than those named and derived from a biological source, e.g., various pentoses, hexoses, and the like. The dihydric alcohol is generally added to a mixture containing the aromatic polyester and the aliphatic dicarboxylic acid.

The aromatic dicarboxylic acid group is the residue of an aromatic dicarboxylic acid that is incorporated into the copolyester when the polyester reacts with the dihydric alcohol and the aliphatic dicarboxylic acid under conditions sufficient to form the copolyester. Examples of the aromatic dicarboxylic acid group include isophthalic acid groups, terephthalic acid groups, and a combination thereof. The aromatic polyester is thus a polyester containing aromatic dicarboxylic acid residues, and can be any aromatic polyester, which when reacted with the first dihydric alcohol and an aliphatic dicarboxylic acid, forms a copolyester containing aromatic dicarboxylic acid groups, first dihydric alcohol groups, and second dihydric alcohol groups. In an embodiment, the aromatic polyester contains (i) at least 40 mole % of total acid groups as aromatic dicarboxylic acid groups and (ii) is selected from poly(ethylene terephthalate), poly(butylene terephthalate), polypropylene terephthalate, copolymers of the foregoing, and combinations thereof. Specific examples of suitable aromatic polyesters include poly(ethylene terephthalate) homopolymers and copolymers, poly(butylene terephthalate) homopolymers and copolymers, poly(trimethylene terephthalate) homopolymers and copolymers, and combinations thereof. The aromatic polyester can be petroleum-derived or bio-derived, and in an embodiment is a recycle aromatic polyester, for example recycle poly(ethylene terephthalate). The recycle polyester can be in any form, e.g., flakes, pellets, and the like.

The aliphatic dicarboxylic acid group the residue of an aliphatic dicarboxylic acid that is incorporated into the copolyester when the aromatic polyester reacts with the first dihydric alcohol and the aliphatic dicarboxylic acid to form the copolyester. Examples of the aliphatic dicarboxylic acid include components having the general formula $(CH_2)_m(COOH)_2$, where m is an integer from 2 to 10. Preferably, the aliphatic dicarboxylic acid can be, adipic acid, or succinic acid. When the aliphatic dicarboxylic acid is adipic acid, the value of m is 4. When the aliphatic dicarboxylic acid is succinic acid, the value of m is 2. In an embodiment all or a portion of the aliphatic dicarboxylic acid is a bio-based aliphatic dicarboxylic acid. For example, bio-based succinic acid is available from suppliers such as DSM and Myriant Technologies and bio-based adipic acid is available from Rennovia.

The aliphatic-aromatic copolyester further comprises a second dihydric alcohol group, i.e., residue of a second dihydric alcohol, that is derived from the aromatic polyester, and that is incorporated into the copolyester when the first dihydric alcohol reacts with the aromatic polyester in the presence of the aliphatic dicarboxylic acid. As such, unlike the first dihydric alcohol, the second dihydric alcohol is not added to a mixture containing the polyester and the aliphatic dicarboxylic acid. Examples of second dihydric alcohol groups can include the residues of ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), hexylene glycol, and a combination thereof. Because the second dihydric alcohol groups are derived from the aromatic polyester, the first and the second dihydric alcohol groups can be the same or different. For example, the first dihydric alcohol groups can be residues of 1,4-butanediol, 1,3-propanediol, ethylene glycol, or combinations thereof and the second dihydric alcohol groups can be ethylene glycol, diethylene glycol, 1,3-propanediol, 1,4-butanediol, or combinations thereof. The first dihydric alcohol groups and the second dihydric alcohol groups are the same in an embodiment. The first dihydric alcohol groups and the second dihydric alcohol groups are different in another embodiment.

In a specific embodiment, the first dihydric alcohol is 1,4-butanediol, 1,3-propanediol, ethylene glycol, or a combination thereof; the aliphatic dicarboxylic acid is decanedioic acid, adipic acid, sebacic acid, or a combination thereof; the second dihydric alcohol group is the residue of ethylene glycol, 1,3-propanediol, 1,4-butanediol, or a combination thereof; and the aromatic polyester is a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, and combinations thereof.

The amount the first dihydric alcohol group and the second dihydric alcohol group in the copolyester can vary. In an embodiment, the first dihydric alcohol group is present in an amount from 80 to 99.6 mole % of total dihydric alcohol content and the second dihydric alcohol group is present in an amount from 0.4 mole % to 20.0 mole % of the total dihydric alcohol content. In another embodiment, the first dihydric alcohol group is present in an amount from 85 to 99.4 mole % of total content of dihydric alcohol groups in the composition and the second dihydric alcohol group is present in an amount from 0.6 to 15.0 mole % of the total dihydric alcohol content.

The relative amounts of the aromatic dicarboxylic acid group and the aliphatic dicarboxylic acid group can vary. In an embodiment, the aromatic dicarboxylic group and the aliphatic dicarboxylic group have an aromatic dicarboxylic group:aliphatic dicarboxylic group mole ratio from 0.6:1 to 6:1. In another embodiment, the aromatic dicarboxylic group and the aliphatic dicarboxylic group are present at an aromatic dicarboxylic group:aliphatic dicarboxylic group mole ratio from 0.6:1 to 1.3:1.

The content of aromatic acid groups (in particular isophthalic acid groups and terephthalic acid groups) in the copolyester varies depending on the aromatic polyester used and the reaction conditions. In an embodiment the aromatic dicarboxylic acid group contains from 0.2 to 3.0 mole % of isophthalic acid group and from 47 to 49.8 mole % percent of terephthalic acid groups, based on the total moles of acid groups present in the copolymer.

In a specific embodiment, the first dihydric alcohol group is present in an amount from 80 to 99.6 mole % of the total dihydric alcohol content and the second dihydric alcohol group is present in an amount from 0.4 mole % to 20.0 mole % of the total dihydric alcohol content, the aromatic dicarboxylic group and the aliphatic dicarboxylic group have an aromatic dicarboxylic group:aliphatic dicarboxylic mole ratio from 0.6:1 to 6:1, and the aromatic dicarboxylic acid group contains from 0.2 to 3.0 mole % of isophthalic acid groups and from 47 to 49.8 mole % terephthalic acid groups, each based on the total moles of dicarboxylic acid groups in the copolymer.

The copolyesters can further comprise other residues present in the aromatic polyester, including catalyst residues from the manufacture of the aromatic polyester, residues from additives in the aromatic polyester, or residues arising from side reactions that occur during manufacture of the aromatic polyester and/or the reaction of the first dihydric alcohol, the aliphatic diacid, and the aromatic polyester.

For example, when the aromatic polyester includes a poly(ethylene terephthalate) component, the aromatic polyester can include a poly(ethylene terephthalate) homopolymer, a poly(ethylene terephthalate) copolymer, or a combination thereof, and the aliphatic-aromatic copolyester contains a residue derived from the poly(ethylene terephthalate) component. Residues derived from the poly(ethylene terephthalate) component can be ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorous-containing compounds and anions, sulfur-containing compounds and anions, naphthalene dicarboxylic acids, 1,3-propanediol groups, or combinations thereof. In an embodiment, the residue derived from the poly(ethylene terephthalate) component comprises ethylene glycol groups, diethylene glycol groups, and more particularly a combination of ethylene glycol groups, diethylene glycol groups.

The aliphatic-aromatic copolyester comprises from more than 0 to less than 450 ppm of the phosphorus-containing compound, from more than 0 to less than 300 ppm of the nitrogen-containing compound, and from more than 0 to less than 300 ppm of the boron-containing compound based on the total weight of the copolyester.

Accordingly, our invention includes embodiments in which the residue derived from the poly(ethylene terephthalate) component includes individual elements and combinations of the foregoing materials. The residue derived from the poly(ethylene terephthalate) component, for instance, can comprise isophthalic acid groups. In an embodiment, the residue derived from the poly(ethylene terephthalate) component further comprises the cis isomer of 1,3-cyclohexanedimethanol, cis isomer of 1,4-cyclohexanedimethanol, trans isomer of 1,3-cyclohexanedimethanol, trans isomer of 1,4-cyclohexanedimethanol and combinations thereof. In an embodiment, the residue derived from the poly(ethylene terephthalate) component includes a combination of ethylene glycol and diethylene glycol groups, optionally with isophthalic acid groups, and can further comprise the cis isomer of 1,3-cyclohexanedimethanol, the cis isomer of 1,4-cyclohexanedimethanol, the trans isomer of 1,3-cyclohexanedimethanol, trans isomer of 1,4-cyclohexanedimethanol, or combinations thereof. In an embodiment, the residue derived from the polyethylene terephthalate component comprises ethylene glycol groups, diethylene glycol groups, isophthalic acid groups, the cis isomer of cyclohexanedimethanol, the trans isomer of cyclohexanedimethanol, and combinations thereof. In an embodiment, the residue derived from the poly(ethylene terephthalate) component comprises ethylene glycol groups, diethylene glycol groups, and cobalt-containing compounds; in another embodiment the residue derived from the poly(ethylene terephthalate) component further comprises isophthalic acid groups.

When the aromatic polyester is poly(butylene terephthalate), the composition can contain poly(butylene terephthalate) residues such as butane diol, titanium, tin, or combinations thereof, optionally together with epoxies.

When the aromatic polyester is poly(trimethylene terephthalate), the composition contains poly(trimethylene terephthalate) residues such as propane diol, titanium, tin, or combinations thereof.

The copolyester generally has a number average molecular weight of at least 20,000 Daltons and a polydispersity index from 2 to less than 6, specifically 2 to 5. In an embodiment, the copolyester has a glass transition temperature (Tg) from −35° C. to 0° C. In another embodiment, the copolyester has a melting temperature (Tm) from 90° C. to 160° C.

The biodegradable composition includes, in addition to the copolyester, other components combined with the copolyester, for example other polymers and additives, for example additives used in the formulation of molding compositions. Examples of the polymers include aliphatic polyesters, aromatic polycarbonates, aliphatic polycarbonates, starches, aromatic polyesters, cycloaliphatic polyesters, polyesteramides, and the like. The polymers can be wholly or partially bio-derived, including petroleum-derived aromatic polyesters and bio-derived aromatic polyesters.

In an embodiment the copolyester is combined with an aliphatic polyester, for example poly(lactic acid), polyhydroxyalkanoate, poly(butylene succinate), poly(butylene adipate), poly(butylene succinate adipate) and poly(caprolactone), or a combination thereof. Polyhydroxyalkanoates (PHAs) are linear polyesters produced in nature by bacterial fermentation of sugar or lipids, and include, for example, poly(R-3-hydroxybutyrate) (PHB or poly(3HB)).

In another embodiment the copolyester is combined with an aromatic polyester, for example a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, or a combination thereof.

The amounts of the copolyesters and the additives, for example a polymer can vary depending on the desired properties of the biodegradable composition. In an embodiment the additives are present in an amount from 2 to 90 wt. %, for example from 2 to 40 wt. % or from 40 to 90 wt. %, based on the total weight of the composition. When the copolyester is used with starch, the amount of starch can range from 40 to 90 wt. %, and the amount of polyester can range from 10 to 60%, based on the total weight of the total composition. When the copolyester is used in conjunction with polylactic acid, the amount of the copolyester can range from 40 to 90 wt. % and the amount of polylactic acid can range from 10 to 60 wt. %, specifically 40 to 60%, based on the total weight of the composition.

Additives ordinarily incorporated into polymer compositions can be used, with the proviso that the additives are selected so as to not significantly adversely affect the desired properties of the composition, for example, biodegradability, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, flame retardants, anti-drip agents, and radiation stabilizers. Combinations of additives can be used, for example an antioxidant, a UV absorber, and a mold release agent. The total amount of additives (other than any impact modifier, filler, or reinforcing agents) is generally 0.01 to 5 wt. %, based on the total weight of the composition. In a specific embodiment, from 0.01 to 5.00 wt. % of a nucleating agent, antioxidant, UV stabilizer, plasticizers, epoxy compound, melt strength additive, or a combination thereof is used.

In an embodiment, the composition has a storage modulus obtained through DMA of 30 to 116 MPa.

Advantageously, the copolyester and compositions containing the copolyester can be biodegradable. This means that the copolyester and compositions containing the copolyester exhibit aerobic biodegradability, as determined by ISO 14855-1:2005. ISO 14855-1:2005, as is known, specifies a method for the determination of the ultimate aerobic biodegradability of plastics, based on organic compounds, under controlled composting conditions by measurement of the amount of carbon dioxide evolved and the degree of disintegration of the plastic at the end of the test. This method is designed to simulate typical aerobic composting conditions for the organic fraction of solid mixed municipal waste. The test material is exposed to an inoculum, which is derived from compost. The composting takes place in an environment wherein temperature, aeration, and humidity are closely monitored and controlled. The test method is designed to yield the percentage conversion of the carbon in the test material to evolved carbon dioxide as well as the rate of conversion. Also specified is a variant of the method, using a mineral bed (vermiculite) inoculated with thermophilic microorganisms obtained from compost with a specific activation phase, instead of mature compost. This variant is designed to yield the percentage of carbon in the test substance converted to carbon dioxide and the rate of conversion. Generally, our copolyesters (and compositions containing copolyesters) exhibit a biodegradation (measured in % of solid carbon of the test item that is converted into gaseous, mineral C in the form of $CO_2$), which is at least 30% after 75 days. In an embodiment, the copolyesters (and compositions containing copolyesters) exhibit a biodegradation, which is at least 40% or 50% after 75 days. The biodegradation of the copolyesters (and compositions containing copolyesters) can range from at least 30% to 50%, or at least 30% to 60%, or at least 30% to 70%.

Advantageously, useful articles can be made from the copolyester and compositions containing the copolyester. In a specific embodiment, an article is extruded, calendared, or molded, for example blow molded or injection molded from the copolymer or the composition containing the copolymer. The article can be a film or a sheet. When the article is a film, the article can be formed by extrusion molding or calendaring the copolyester or composition containing the copolyester. The copolyesters and compositions containing the copolyesters are useful for films, for example film packaging applications, among other applications.

The typical film of the copolyester or copolyester composition has a Tg that is at least −32 to 0° C., (ii) a Tm ranging from 80 to 120° C., and (iii) a modulus from 30 MPa to 116 MPa.

As stated above, various combinations of the foregoing embodiments can be used.

The invention is further described in the following illustrative examples in which all parts and percentages are by weight unless otherwise indicated.

EXAMPLES

Materials

Following is a list of materials, acronyms, and selected sources used in the examples.

PET—Polyethylene Terephthalate—Futura Polyesters, India
SA—Bio-based Succinic Acid—Roquette, DSM
PSA—Petroleum-based succinic Acid—Acros Chemicals
BDO—Butane Diol—BASF
TPT—Tetraisopropyl titanate—DuPont de Nemours
PBS—poly(butylene succinate)—Lab Synthesis
PBST—poly(butylene succinate terephthalate)
Commercial PBAT—Poly(butylene terephthalate-co-adipate)—BASF
Recycled PBAT—Poly(butylene terephthalate-co-adipate) derived from recycle poly(ethylene terephthalate) by the procedure described below in the "Techniques and Procedures Section."

Examples 1-4 and Comparative Examples 1-8

The purpose of Examples 1-7 was to manufacture the copolyester poly(butylene terephthalate-co-succinate) (PBTS) derived from PET in accordance with the invention. The materials, amounts, and reaction conditions for Examples 1-7 are shown in Table 1.

TABLE 1

| Ex. No. | PET (mol) | SA (mol) | BDO (mol) | EI Temp. (° C.) | EI Time (min) | Poly Temp. (° C.) | Poly Time (min) |
|---|---|---|---|---|---|---|---|
| 1 | 0.25 | 0.25 | 0.5 | 220 | 45 | 250 | 72 |
| 2 | 0.20 | 0.30 | 0.5 | 220 | 48 | 250 | 79 |
| 3 | 0.13 | 0.37 | 0.5 | 220 | 51 | 250 | 82 |
| 4 | 0.08 | 0.42 | 0.5 | 220 | 60 | 250 | 89 |
| 5* | 0.05 | 0.45 | 0.5 | 220 | 43 | 250 | 92 |
| 6* | 0.03 | 0.47 | 0.5 | 220 | 49 | 250 | 120 |
| 7* | 0.02 | 0.48 | 0.5 | 220 | 61 | 250 | 126 |

*Comparative Example

Techniques and Procedures

PBTS as used in Examples 1-7 was prepared using a standard melt polycondensation process. The desired amount of PET flakes, bio-based succinic acid (SA) and 1,4-butanediol (BDO) were introduced into a three-neck round bottom flask. The reactor was placed in an oil bath with the temperature adjusted to 170° C., 250 ppm of tetraisopropyl titanate (TPT) was added to the reaction mixture, and the ester interchange (EI) temperature was increased to 220° C. at a rate of 2° C./min while stirring at 260 rpm under nitrogen. The ester interchange step was completed in approximately 45 minutes. The temperature of the reaction mixture was increased to 250° C. The residual PET flakes were completely melted in 10 minutes. The polymerization stage (Poly) was conducted at the same temperature with the vacuum adjusted to less than 1 torr for approximately 30 minutes.

PBTS, as used in Example 8 was prepared using a standard melt polycondensation process as described for Examples 1-7, except that PSA (petroleum-based succinic acid) was used instead of bio-based succinic acid.

Procedure for Making PBAT. PBAT was made in the presence of a phosphorus-containing catalyst prepared in situ by complexation between TPT and phosphoric acid in 1:1 mole ratio in accordance to the following procedure. 5 0 g of BDO and 0.5 ml of phosphoric acid solution in water (0.1 g/mL) were introduced into a three neck round bottom flask. The reactor was placed in an oil bath, the temperature of which was adjusted to 175° C. After 20 minutes, 250 ppm of TPT was added to the reactor and an in situ reaction between phosphoric acid and TPT was carried for 40 minutes under inert atmosphere. Then, 48 g of recycle PET, 36.5 g of ADA, and 30 g of additional BDO were introduced into the catalyst solution and the ester interchange temperature was increased to 220° C. at a rate of 2° C./min while stirring at 260 rpm under nitrogen. After the evolution of water/ethylene glycol ceased, the temperature of the reaction was further increased to 260° C. to melt the residual PET flakes completely. Polymerization was initiated with the vacuum adjusted to below 1 Torr for 90 minutes. The polymerization was stopped after achieving desired intrinsic viscosity. The resulting copolyester was white.

Results

Table 2 shows the glass transition temperature (Tg), melting temperature (Tm), heat of fusion (H$_f$) (obtained from differential scanning calorimetry (DSC)), storage modulus (obtained by dynamic mechanical analysis (DMA) of films containing the samples), and intrinsic viscosity (IV) of Examples 1-7.

Table 2 also shows the chemical composition of the copolyesters of Examples 1-7. The chemical composition of the copolyesters (based on residues of the starting materials) was calculated in mole %, based on H$^1$ NMR spectroscopy.

TABLE 2

| Ex. No. | Tm (°C.) | Tg (°C.) | Hf (J/g) | IV (dL/min) | Storage Modulus at 25° C. (MPa) | Isophthalic (Mol %) | Terephthalic (Mol %) | Succinic (Mol %) | BDO (Mol %) | EG (Mol %) |
|---|---|---|---|---|---|---|---|---|---|---|
| 1 | 116 | −5.8 | 36.3 | 1.33 | 90 | 0.7 | 25.8 | 23.6 | 44.6 | 5.4 |
| 2 | 70 | −24 | 40.7 | 1.41 | 96 | 0.6 | 20.9 | 28.6 | 46.6 | 3.3 |
| 3 | 92 | −13.8 | 41.2 | 1.24 | 39 | 0.3 | 13.5 | 36.2 | 46.8 | 3.1 |
| 4 | 88 | −30.3 | 47.7 | 1.58 | 116 | $1.3 \times 10^{-5}$ | 9.4 | 40.1 | 57.9 | 2.5 |
| 5* | 100 | −32 | 40.7 | 1.55 | 376 | 0.02 | 5.8 | 43.7 | 48.4 | 2.1 |
| 6* | 103 | −35 | 64.9 | 1.77 | 499 | $3.2 \times 10-3$ | 3.7 | 46.2 | 49.1 | 0.6 |
| 7* | 107 | −33 | 75 | 1.56 | 505 | $1.5 \times 10-3$ | 2.5 | 47.2 | 49.9 | 0.4 |

*Comparative Example

The results in Table 2 show that the PBTS derived from PET in accordance with the invention (Examples 1-4) had a bio-derived aliphatic dicarboxylic acid (bio-based succinic acid) content of more than 23 mole % (Example 1) and less than 43 mole % (less than the succinic acid content of Comparative Example 5).

Table 3 shows a comparison of the biobased and petroleum-based succinic content, as well as bio-based carbon content of the PBTS of Examples 1, 7, and 8. Example 8 is a PBTS manufactured from petroleum-derived succinic acid obtained from Acros Organics, Inc. The chemical composition of the copolyesters (based on residues of the starting materials) was calculated in mole %, based on $H^1$ NMR spectroscopy. The weight percent of bio-based carbon in Examples 1, 7, and 8 was calculated based on ASTM D6866.

TABLE 3

| Ex. No. | Bio-Based Succinic (Mol %) | Petro-Based Succinic (Mol %) | Bio-Based Carbon (Wt. %) |
|---|---|---|---|
| 1 | 24 | 0 | 17 |
| 7* | 47 | 0 | 41 |
| 8* | 0 | 24 | 0 |

*Comparative Example

The results in Table 3 show that the copolyester of Example 8, which was made from petro-derived succinic acid, did not have any bio-based carbon content.

Table 4 shows the glass transition temperature (Tg), melting temperature (Tm), heat of fusion ($H_f$) (obtained from DSC) and storage modulus (obtained through DMA) of poly(butylene succinate) (PBS), commercial poly(butylene terephthalate-co-adipate) (com-PBAT), and recycled poly(butylene terephthalate-co-adipate (recycle-PBAT).

TABLE 4

| Example | Tm (°C.) | Tg (°C.) | Hf (J/g) | Storage Modulus at 25° C. (MPa) |
|---|---|---|---|---|
| PBS* | 113 | −32 | 89 | 548 |
| Commercial PBAT* | 117 | −28 | 31 | 50 |
| Recycle PBAT* | 113 | −25 | 16 | 30 |

*Comparative Example

Table 4 shows that the copolyester of Example 8, which was made from petro-derived succinic acid did not have any bio-based carbon content.

Discussion

The results in Tables 2 and 3 show that when the PBTS derived from PET contained from 23 to less than 43 mole % of bio-based succinic acid residues, it had a bio-based carbon content ranging from 17 to less than 41 wt. %, and it exhibited the following useful combination of properties: (i) a Tg that is at least −30 to −0° C., (ii) a Tm ranging from 80 to 120° C., and (iii) a modulus from 30 MPa to 116 MPa (Examples 1-4). Conversely, Comparative Examples 5-7 show that when the copolyester did not contain from 23 to less than 43 mole % of bio-derived succinic acid, the copolyester did not exhibit the following useful combination of properties, namely (i) a Tg that is at least −32 to 0° C., (ii) a Tm ranging from 80 to 120° C., and (iii) a modulus from 30 MPa to 116 MPa.

The results in Table 2 further show that the current process provided PBST having a high intrinsic viscosity.

The $T_m$ of the PBTS varied according to the mole percent of succinic acid residues in the backbone of the copolyester as shown in Table 2 and as further shown in FIG. 1. It can be seen from FIG. 1 that the $T_m$ reaches a minimum with incorporation of 29 mol % of succinic acid into the copolyester backbone, then increases in a linear fashion with increasing mole percent of succinic acid.

$H_f$ is an important parameter that provides information regarding the percent crystallinity of the copolyesters. Even though the introduction of the post-consumer PET into the backbone of PBTS decreases the percent crystallinity of the resulting copolyesters compared to PBS (Examples 1-7 vs. PBS in Table 4), all the resulting PBTS copolyesters exhibit higher crystallinity that commercial PBAT (Examples 1-7 vs. commercial PBAT in Table 4). The increase of the percent crystallinity is associated with the increase of the butylene succinate content in the copolyester composition (FIG. 1). On the other hand, the Tg of the PBTS copolyesters follows an opposite trend (FIG. 2), in that Tg decreases with an increase butylene succinate content.

Figure 2:
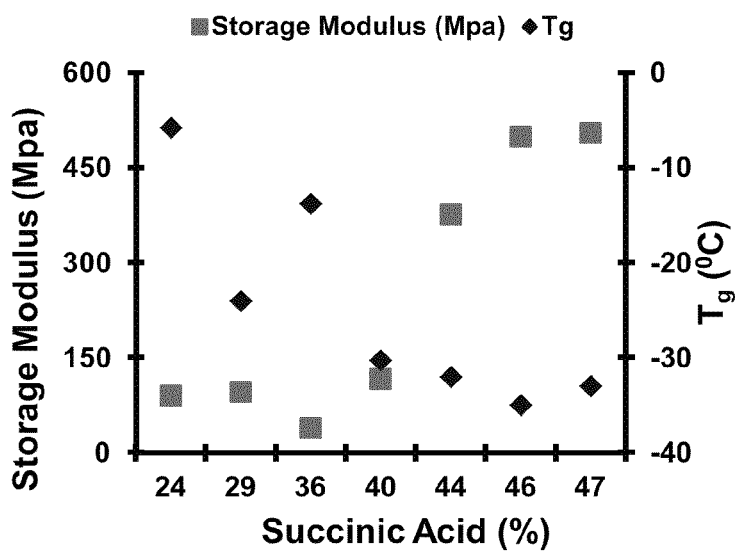
FIG. 2 is a graph showing the effect of mole percent of succinic acid in the backbone of poly(butylene terephthalate-co-succinate) on Tg and the storage modulus of films comprising poly(butylene terephthalate-co-succinate) derived from PET at room temperature.

When the PBST copolyesters are to be used in film blowing processes, the tear resistance of the films is an important parameter. Since the storage modulus of the films can be correlated directly to their tear resistance property (as well as their flexibility) at a given temperature, the storage modulus at the room temperature was used to evaluate the suitability of the bio-based PBST films in film blowing processes. DMA analysis was carried out on a film of the bio-based succinic acid copolyesters to investigate change in storage modulus with succinic acid content. Films were prepared by a melt press process. FIG. 2 shows the change of the storage modulus as a function of succinic acid content in the backbone of the copolyesters. The data can be analyzed by dividing into two regions. In the first region, the lower butylene succinate content leads to lower storage modulus, due to the low crystallinity. The correspondingly higher aromatic content imparts hardness to the amorphous region, which exhibits a higher Tg as described above. In the second region, the storage modulus increases significantly with incorporation of 40 mol % succinic acid into the copolyester backbone. The butylene succinate phase becomes dominant in the morphology and the percent crystallinity increases, also reducing the flexibility of the films. However, the predominant aliphatic content reduces the hardness in the amorphous regions, causing a significant decrease in Tg.

These results show that PBTS derived from PET contained from 23 to less than 43 mole % of bio-based succinic acid residues have a bio-based carbon content ranging from 17 to less than 41 wt %, and exhibit commercially useful properties, including high IV, as well as (i) a Tg that is at least −32 to −0° C., (ii) a Tm ranging from 80 to 120° C., and (iii) a modulus from 30 MPa to 116 MPa. In particular, although the Tm of Example 4 is lower compared to the Tm commercial PBAT, the Tg, $H_f$, and storage modulus are close to those of commercial aliphatic-aromatic copolyesters (e.g., ECOFLEX from BASF).

All cited patents, patent applications, and other references are incorporated herein by reference in their entirety. However, if a term in the present application contradicts or conflicts with a term in the incorporated reference, the term from the present application takes precedence over the conflicting term from the incorporated reference. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An aliphatic-aromatic copolyester reaction product in which a polymer is formed comprising:
    (a) a dihydric alcohol group, which is a residue of a dihydric alcohol, selected from the group consisting of an ethylene glycol group, 1,2-propylene glycol group, 1,3-propylene glycol group, 1,2-butanediol group, 2,3-butanediol group, 1,4-butanediol group, tetramethyl cyclobutanediol, isosorbide groups, 1,3-cyclohexanedimethanol groups, 1,4-cyclohexanedimethanol groups, hexylene glycol groups, bio-derived diol groups, and combinations thereof;
    (b) an aromatic dicarboxylic acid group that is derived from a depolymerized aromatic polyester component selected from poly(ethylene terephthalate) homopolymers and copolymers, poly(butylene terephthalate) homopolymers and copolymers, poly(trimethylene terephthalate) homopolymers and copolymers, and combinations thereof; and
    (c) from 23 to less than 43 mole % based on the copolyester of bio-based succinic acid groups;
    wherein the aliphatic-aromatic copolyester further comprises a titanium catalyst and a residue from the aromatic polyester component, wherein the residue is selected from the group consisting of an isophthalic acid group, antimony-containing compounds, germanium-containing compounds, cobalt-containing compounds, tin, tin-containing compounds, titanium, titanium-containing compounds, aluminum, aluminum salts, alkaline salts, alkaline earth metal salts, phosphorus-containing compounds, sulfur-containing compounds, naphthalene dicarboxylic acid groups, epoxies, and combinations thereof; and
    wherein the aliphatic-aromatic copolyester has:
    a bio-based carbon content from 17 to less than 41 weight %, based on total carbon according to ASTM D6866,
    a $T_g$ that is at least −32 to 0° C.,
    a $T_m$ from 80 to 120° C., and
    a storage modulus at 25° C. from 90 MPa to 116 MPa.

2. The copolyester of claim 1, wherein the copolyester has a number average molecular weight of at least 20,000 Daltons.

3. The copolyester of claim 1, wherein the copolyester has a polydispersity index from 2 to less than 6.

4. The copolyester of claim 1, wherein the dihydric alcohol group is selected from the group consisting of a 1,4-butanediol group, 1,3-propanediol group, ethylene glycol group, and combinations thereof.

5. The copolyester of claim 1, wherein the aromatic dicarboxylic acid group contains from 0 to 3.0 mole % of isophthalic acid groups and from 6 to 30 mole % terephthalic acid groups, each based on the total moles of dicarboxylic acid groups and dihydric alcohol groups in the copolyester.

6. The copolyester of claim 1, wherein the aromatic polyester component comprises a polymer selected from the group consisting of poly(trimethylene terephthalate)s derived from petroleum-derived 1,3-propanediol, poly(trimethylene terephthalate)s derived from bio-derived 1,3-propanediol, poly(butylene terephthalate)s derived from petroleum-derived 1,4-butanediol, poly(butylene terephthalate)s derived from bio-derived 1,4-butanediol, poly(trimethylene terephthalate)s derived from post-consumer poly(ethylene terephthalate)s, poly(butylene terephthalate)s derived from post-consumer poly(ethylene terephthalate)s, virgin poly(ethylene terephthalate)s, recycled poly(ethylene terephthalate)s, post-consumer poly(ethylene terephthalate)s, recycled poly(trimethylene terephthalate)s, recycled copolyesters of terephthalic acid with ethylene glycol and cyclohexane dimethanol, and combinations thereof.

7. The copolyester of claim 1, wherein the aromatic polyester component comprises poly(butylene terephthalate), and the aromatic polyester residue is selected from the group consisting of titanium, titanium-containing compounds, tin, tin-containing compounds, epoxies, and combinations thereof.

8. The copolyester of claim 1, wherein the aromatic polyester component comprises poly(trimethylene terephthalate) and the aromatic polyester residue is selected from the group consisting of titanium, titanium-containing compounds, tin, tin-containing compounds, epoxies, and combinations thereof.

9. The copolyester of claim 1, wherein the aromatic polyester component comprises a poly(ethylene terephthalate) homopolymer, copolymers of poly(ethylene terephthalate), or combinations thereof, and the aromatic copolyester residue is selected from the group consisting of an isophthalic acid group, antimony-containing compounds, germanium-containing compounds, cobalt-containing compounds, tin-containing compounds, aluminum, aluminum salts, alkaline salts, alkaline earth metal salts, phosphorus-containing compounds, sulfur-containing compounds, naphthalene dicarboxylic acid groups, and combinations thereof.

10. The copolyester of claim 9, wherein the dihydric alcohol group is selected from the group consisting of ethylene glycol group, diethylene glycol group, a cis isomer of a 1,3-cyclohexanedimethanol group, cis isomer of a 1,4-cyclohexanedimethanol group, a trans isomer of a 1,3-cyclohexanedimethanol group, a trans isomer of 1,4-cyclohexanedimethanol group, and combinations thereof.

11. The copolyester of claim 9, wherein the aromatic polyester residue further comprises an isophthalic acid group.

12. The copolyester of claim 1, having a $T_g$ from −32° C. to −25° C.

13. The copolyester of claim 1, having a $T_m$ from 80° C. to 100° C.

14. A composition, comprising a reacted product of:
    (i) from more than 10 to 59.96 wt. %, based on the total weight of the composition, of the aliphatic-aromatic copolyester of claim 1;

(ii) from more than 40 to less than 89.96 wt. %, based on the total weight of the composition, of a polymer selected from aliphatic polyesters, aliphatic polycarbonates, starches, aromatic polyesters, cycloaliphatic polyesters, polyesteramides, aromatic polycarbonates, and combinations thereof;

(iii) from 0.01 to 5 wt. %, based on the total weight of the composition, of an additive selected from nucleating agents, antioxidants, UV stabilizers, plasticizers, epoxy compounds, melt strength additives, and combinations thereof;

(iv) from 0.01 to 45 wt. %, based on the total weight of the composition, of an additive selected from alcohols, acetates, alcohol-acetate copolymers, and combinations thereof; and (v) from 0.01 to 2 wt. %, based on the weight of the composition, of an additive selected from crosslinkers, anti-aging agents, retrogradation agents, anti-blocking agents, water, odor-controlling agents, and combinations thereof.

15. The composition of claim 14, wherein the aliphatic polyester is selected from poly(lactic acid)s, poly(hydroxyalkanoate)s, poly(butylene succinate)s, poly(butylene adipate)s, poly(butylene succinate adipate)s, poly(caprolactone)s, and combinations thereof.

16. An article extruded, calendared, extrusion molded, blow molded, solvent cast or injection molded from the composition of claim 14.

17. The article of claim 16, wherein the article is a film.

18. The film of claim 17, wherein the film is formed by extrusion molding or calendaring the composition.

19. A process for preparing the copolyester of claim 1, comprising:
(a) depolymerizing the aromatic polyester component, by reacting
(i) the aromatic polyester component with
(ii) a diol component selected from ethylene glycol, 1,2-propylene glycol, 1,3-propylene glycol, 1,2-butanediol, 2,3-butanediol, 1,4-butanediol, tetramethyl cyclobutanediol, isosorbide, 1,3-cyclohexanedimethanol isomers, 1,4-cyclohexanedimethanol isomers, hexylene glycol, bio-derived diols, and combinations thereof, in the presence of
(iii) bio-based adipic acid, bio-based succinic acid,
in a reactor, at a pressure that is at least atmospheric pressure, at a temperature from 160° C. to 250° C., under an inert atmosphere and with agitation, under conditions sufficient to depolymerize the aromatic polyester component into a molten mixture; and
(b) increasing the temperature of the molten mixture under subatmospheric conditions and agitation to a temperature from 240° C. to 270° C., thereby forming the copolyester of claim 1;
wherein the process is carried out in the presence of the titanium catalyst composition optionally comprising titanium and a color-reducing amount of a compound selected from phosphorus-containing compounds, nitrogen-containing compounds, boron-containing compounds, and combinations thereof.

20. The process of claim 19, wherein the diol component comprises 1,4-butane diol.

21. The process of claim 19, wherein
the diol component comprises a diol selected from ethylene glycol, 1,2-propylene glycol, 1,3-propylene glycol, and combinations thereof; and
the process further comprises adding 1,4-butane diol to the molten mixture.

22. The process of claim 19, wherein the aromatic polyester component comprises a polymer selected from poly(trimethylene terephthalate)s derived from petroleum-derived 1,3-propanediol, poly(trimethylene terephthalate)s derived from bio-derived 1,3-propanediol, poly(butylene terephthalate)s derived from petroleum-derived 1,4-butanediol, poly(butylene terephthalate)s derived from bio-derived 1,4-butanediol, poly(trimethylene terephthalate)s derived from post-consumer poly(ethylene terephthalate) s, poly(butylene terephthalate)s derived from post-consumer poly(ethylene terephthalate) s, virgin poly(ethylene terephthalate) s, recycled poly(ethylene terephthalate)s, post-consumer poly(ethylene terephthalate)s, recycled poly(trimethylene terephthalate) s, recycled copolyesters of terephthalic acid with ethylene glycol and cyclohexane dimethanol, and combinations thereof.

23. The process of claim 19, wherein the titanium catalyst composition is made in situ during the depolymerization of the aromatic polyester component.

24. The process of claim 19, wherein the titanium catalyst composition is made prior to the depolymerization of the aromatic polyester component.

25. An aliphatic-aromatic copolyester, comprising a reaction product in which a polymer is formed comprising:
(a) a first dihydric alcohol group, which is a residue of a dihydric alcohol, selected from the group consisting of 1,2-propylene glycol group, 1,3-propylene glycol group, 1,4-butanediol group, and combinations thereof;
(b) a terephthalic acid group and a second dihydric alcohol group, both groups derived from a depolymerized aromatic polyester component selected from the group consisting of depolymerized poly(ethylene terephthalate) homopolymers, depolymerized poly(ethylene terephthalate) copolymers, and combinations thereof; and
(c) from 23 to less than 43 mole % of bio-based succinic acid groups;
wherein the aliphatic-aromatic copolyester further comprises a titanium catalyst and an aromatic polyester residue selected from the group consisting of an isophthalic acid group, antimony-containing compounds, germanium-containing compounds, cobalt-containing compounds, tin, tin-containing compounds, titanium, titanium-containing compounds, aluminum, aluminum salts, alkaline salts, alkaline earth metal salts, phosphorus-containing compounds, sulfur-containing compounds, naphthalene dicarboxylic acid groups, epoxies, and combinations thereof;
wherein the first dihydric alcohol group is present in an amount from 80 to 99.6 mole % of total dihydric alcohol content, the second dihydric alcohol group is present in an amount from 0.4 to 20.0 mole % of total dihydric alcohol content, and isophthalic acid groups are present in an amount of 0.2 to 3.0 mole %, based on the total moles of dicarboxylic acid groups; and
wherein the aliphatic-aromatic copolyester has:
a bio-based carbon content from 17 to less than 41 weight % based on total carbon according to ASTM D6866,
a number average molecular weight of at least 20,000 Daltons,
a polydispersity index from 2 to less than 6;
a $T_g$ that is at least −32 to 0° C.,
a $T_m$ from 80 to 120° C., and
a storage modulus at 25° C. from 90 MPa to 116 MPa.

26. The aliphatic-aromatic copolyester of claim 25, wherein the first dihydric alcohol group is 1,4-butanediol and the second dihydric alcohol group is ethylene glycol.

27. The aliphatic-aromatic copolyester of claim 25, wherein the succinic acid group is present in the amount of 23.6 to 40.1 mole percent and the terephthalic acid group is present in the amount of 9.4 to 23.6 mole percent.

* * * * *